US012591711B2

(12) United States Patent
Obstfeld et al.

(10) Patent No.: US 12,591,711 B2
(45) Date of Patent: Mar. 31, 2026

(54) LINEAGE CERTIFICATION FOR DIGITAL ASSETS

(71) Applicant: Cisco Technology, Inc., San Jose, CA (US)

(72) Inventors: Joel Abraham Obstfeld, Bushey (GB); Ronnie I. Dan, Modiin (IL); Oliver James Bull, Bristol (GB)

( * ) Notice: Subject to any disclaimer, the term of this patent is extended or adjusted under 35 U.S.C. 154(b) by 263 days.

(21) Appl. No.: 18/368,776

(22) Filed: Sep. 15, 2023

(65) Prior Publication Data

US 2025/0094641 A1 Mar. 20, 2025

(51) Int. Cl.
| | |
|---|---|
| *G06F 21/64* | (2013.01) |
| *G06F 3/01* | (2006.01) |
| *H04L 9/32* | (2006.01) |
| *H04L 12/18* | (2006.01) |

(52) U.S. Cl.
CPC .............. *G06F 21/64* (2013.01); *G06F 3/013* (2013.01); *H04L 9/3268* (2013.01); *H04L 12/1831* (2013.01)

(58) Field of Classification Search
None
See application file for complete search history.

(56) References Cited

U.S. PATENT DOCUMENTS

| | | | | |
|---|---|---|---|---|
| 10,897,599 | B1 * | 1/2021 | Fardig | .................... H04N 7/147 |
| 11,068,569 | B2 | 7/2021 | Shi | |
| 11,553,105 | B2 | 1/2023 | Speasl et al. | |
| 11,687,778 | B2 * | 6/2023 | Ciftci | ..................... G06V 40/40 |
| | | | | 382/115 |
| 2009/0287931 | A1 | 11/2009 | Kinsella | |
| 2010/0299529 | A1 * | 11/2010 | Fielder | ................ H04L 63/0428 |
| | | | | 713/181 |
| 2021/0067536 | A1 * | 3/2021 | Mylrea | ................. H04L 9/3239 |
| 2022/0269922 | A1 * | 8/2022 | Mathews | ............... G06V 20/46 |
| 2022/0366021 | A1 | 11/2022 | Mccarthy | |
| 2023/0038949 | A1 * | 2/2023 | Kido | ........................ G06F 21/73 |
| 2023/0155812 | A1 | 5/2023 | Bennison | |
| 2023/0325473 | A1 * | 10/2023 | Buffard | ............... G06F 21/1064 |
| | | | | 713/155 |

OTHER PUBLICATIONS

Noureddin et al, A non-contact device for tracking gaze in a human computer interface, Jul. 27, 2004, Science Direct, pp. 52-82 (Year: 2004).*
"Deepfake", online: https://en.wikipedia.org/wiki/Deepfake, accessed Sep. 12, 2023, 36 pages, Wikimedia Foundation, Inc.
Trenholm, Richard, "Star Wars: Rise of Skywalker's CGI-free Carrie Fisher is 'shockingly successful'", online: https://www.cnet.com/culture/entertainment/star-wars-rise-of-skywalkers-cgi-free-carrie-fisher-is-shockingly-successful/, accessed Sep. 12, 2023, 4 pages.

* cited by examiner

*Primary Examiner* — Raqiul A Choudhury
(74) *Attorney, Agent, or Firm* — Lee & Hayes, P.C.

(57) ABSTRACT

In one implementation, a device provides, to a user interface, proof-of-creation information that certifies that data presented by the user interface was created by one or more sensors capturing the data from a real person. The device receives, via the user interface, an edit to the data, to form edited data. The device associates one or more keys with the edited data that are based on the proof-of-creation information and on the edit to the data. The device provides, based on the one or more keys, lineage information to the user interface in conjunction with the edited data that indicates the edit to the data and the proof-of-creation information.

20 Claims, 7 Drawing Sheets

100

350

| STORAGE 324 | EDITING APPLICATION 326 | KEYS 328 | TIMESTAMPS 330 | EDITED DATA 332 | VERIFICATION DATA 334 |

500

505

START

510

PROVIDE PROOF-OF-CREATION INFORMATION
TO USER INTERFACE

515

RECEIVE EDIT TO DATA

520

ASSOCIATE KEY(S) WITH EDITED DATA

525

PROVIDE LINEAGE INFORMATION IN CONJUNCTION WITH
EDITED DATA

530

END

LINEAGE CERTIFICATION FOR DIGITAL ASSETS

TECHNICAL FIELD

The present disclosure relates generally to communication networks, and, more particularly, to lineage certification for digital assets.

BACKGROUND

Computer-generated digital content is becoming increasingly a.) realistic and b.) dramatically easier to create, particularly with generative artificial intelligence (AI) solutions entering the mass market. As the technology improves, it will become increasingly more difficult to determine whether a digital asset (audio, video, image) contains a truthful, unaltered, original capture or creation, or instead consists of, or contains, digitally-created, a synthetic representation. The term 'deepfake' is often used in this context, meaning the employment of software mechanisms to manipulate or generate visual and audio content with the intent of performing some level of deception. For instance, deepfakes have been created to 'digitally resurrect' actors that have died to incorporate them into films.

As generative AI continues to evolve towards the point where deepfakes and other synthetic digital content become nearly indistinguishable from 'real' content, the security risks also continue to increase. For instance, it may soon be possible where a human participant in a videoconference interacts in real-time with an AI-generated participant that looks and sounds almost identical to a real person. This could lead the human participant to divulge confidential or sensitive information to the AI-generated participant, unknowingly. This information could then be used by a malicious actor to perform identity theft, data exfiltration, unauthorized access to a network, or other such malicious actions.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more implementations of the disclosure, a device provides, to a user interface, proof-of-creation information that certifies that data presented by the user interface was created by one or more sensors capturing the data from a real person. The device receives, via the user interface, an edit to the data, to form edited data. The device associates one or more keys with the edited data that are based on the proof-of-creation information and on the edit to the data. The device provides, based on the one or more keys, lineage information to the user interface in conjunction with the edited data that indicates the edit to the data and the proof-of-creation information.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

Figure 1:
FIG. 1 illustrates an example simplified communication network.
Figure 1:
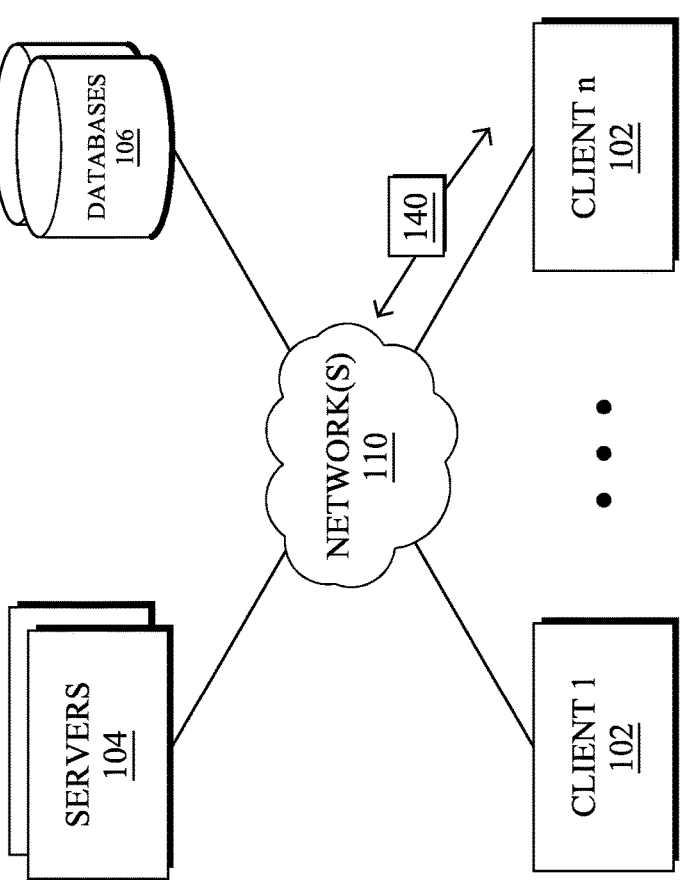

FIG. 1 is a schematic block diagram of an example simplified communication network or computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
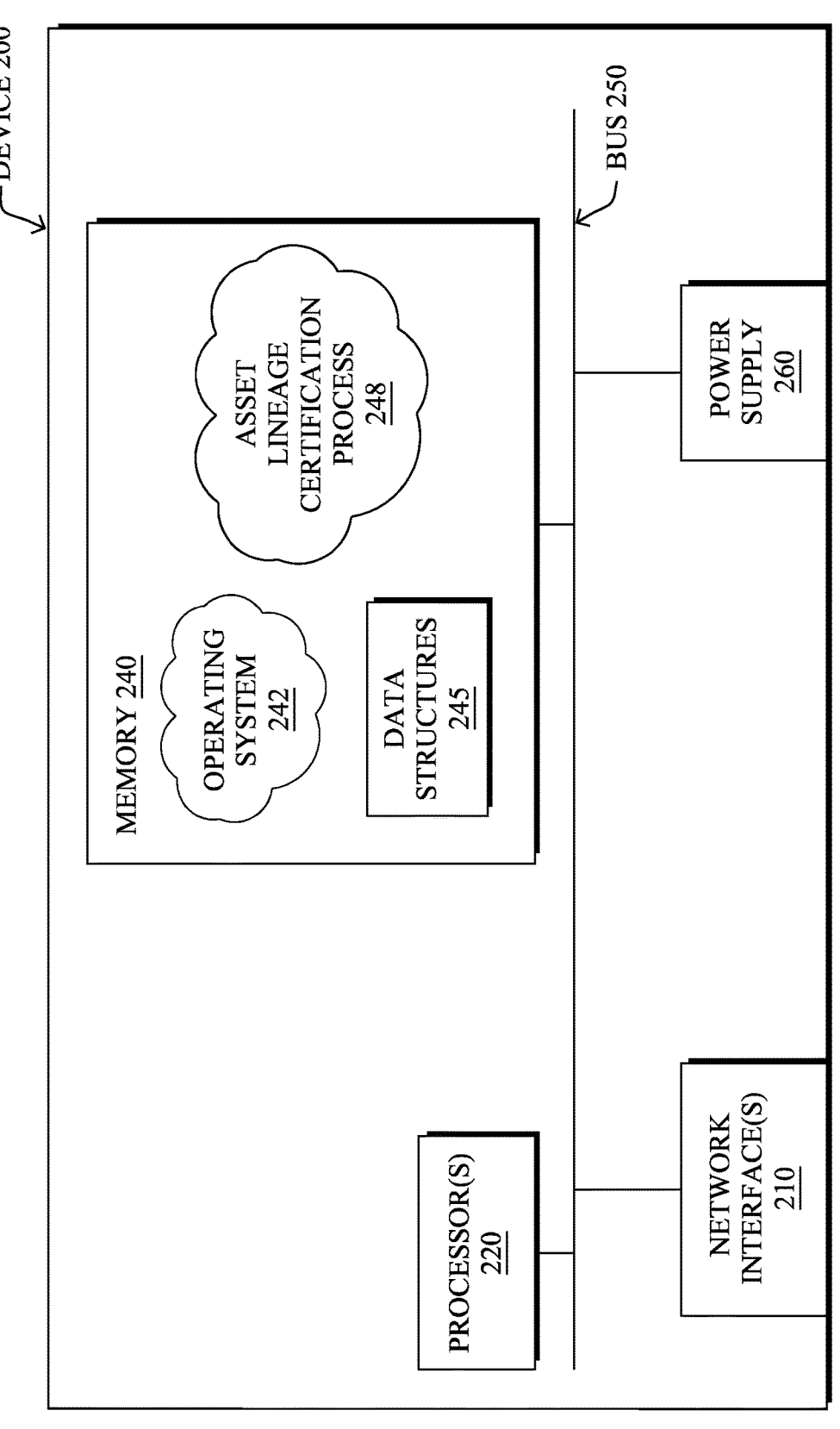
FIG. 2 illustrates an example communication device.

FIG. 2 is a schematic block diagram of an example node/device 200 (e.g., apparatus) that may be used with one or more implementations described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, including satellite connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an asset lineage certification process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, asset lineage certification process 248 may also utilize machine learning techniques, to perform its operations. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, asset lineage certification process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that asset lineage certification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, asset lineage certification process 248 may also include one or more generative artificial intelligence (AI)/machine learning models. In contrast to discriminative models that simply seek to perform pattern matching for purposes such as anomaly detection, classification, or the like, generative approaches instead seek to generate new content or data (e.g., audio, video/images, text, etc.), based on an existing body of training data. Example generative approaches can include, but are not limited to, generative adversarial networks (GANs), large language models (LLMs), other transformer models, and the like.

As noted above, computer-generated digital content is becoming increasingly a.) realistic and b.) dramatically easier to create, particularly with generative artificial intelligence (AI) solutions entering the mass market. As the technology improves, it will become increasingly more difficult to determine whether a digital asset (audio, video, image) contains a truthful, unaltered, original capture or creation, or instead consists of, or contains, a digitally-created, synthetic representation. The term 'deepfake' is often used in this context, meaning the employment of software mechanisms to manipulate or generate visual and audio content with the intent of performing some level of deception. For instance, deepfakes have been created to 'digitally resurrect' actors that have died to incorporate them into films.

As generative AI continues to evolve towards the point where deepfakes and other synthetic digital content become nearly indistinguishable from 'real' content, the security risks also continue to increase. For instance, it may soon be possible where a human participant in a videoconference interacts in real-time with an AI-generated participant that looks and sounds almost identical, or entirely identical, to a real person. This could lead the human participant to divulge confidential or sensitive information to the AI-generated participant, unknowingly. This information could then be used by a malicious actor to perform identity theft, data exfiltration, unauthorized access to a network, or other such malicious actions.

Lineage Certification for Digital Assets

The techniques herein provide for lineage certification for digital assets, such as images, video, audio, and the like. In some aspects, the techniques herein are able to defeat the threat of generative AI techniques, such as deepfakes, as they are able to certify the origin of the asset, that the asset originates from one or more sensors that capture the digital representation of a real person. In addition, the techniques herein further help to protect against generative AI techniques by certifying the lineage of the data, in the case in which the data is later edited.

Illustratively, the techniques described herein may be performed by hardware, software, and/or firmware, such as in accordance with the asset lineage certification process 248, which may include computer executable instructions executed by the processor 220 (or independent processor of interfaces 210) to perform functions (e.g., a method) relating to the techniques described herein, e.g., in conjunction with routing process 244 and/or other processes of other devices, accordingly.

Specifically, a device provides, to a user interface, proof-of-creation information that certifies that data presented by the user interface was created by one or more sensors capturing the data from a real person. The device receives, via the user interface, an edit to the data, to form edited data. The device associates one or more keys with the edited data that are based on the proof-of-creation information and on the edit to the data. The device provides, based on the one or more keys, lineage information to the user interface in conjunction with the edited data that indicates the edit to the data and the proof-of-creation information.

As would be appreciated, most common countermeasures against generative AI attempt to perform automated identification and signaling of fakes. In contrast, the techniques herein propose a universally-enforceable approach that allows content creators to weave proof-of-creation identifiers (IDs) into their content, such that its lineage may be immutable, visible, and known to all consumers of the content, be they human or machine.

In various implementations, to address the situation described previously, the techniques herein are premised on the assumption that all digital assets can be considered to be 'fake' until proven otherwise. To prove the legitimacy of any such data, the system needs to certify any or all of the following:

The origin of the data—where it came from, when it was created, who was involved in its creation, etc.

Proof of life—proof that the person/human depicted in the asset was indeed 'alive' at the point in time that the asset data was created.

Proof of identity—in cases in which the identity of the person depicted in the asset is also identified (e.g., a name tag shown with the person in a videoconference, etc.), proof that the person is who is identified as such.

Confirmation of modification—if an asset has been modified, who undertook the modification and their association to the originator.

In turn, these proofs may be bound to the asset data such that any subsequent consumer of the asset data (e.g., a viewer, a listener, etc.) can validate and verify the authenticity of the data in a continuous and linear fashion, meaning that one can observe if a change has been introduced into a recorded asset. In addition, in case in which the original asset data is later modified (e.g., different video streams combined into a singular videoconference display, the asset data is edited via an editing application, etc.) any modifications to the data post-generation can also be identified and conveyed to the consumer. Additionally, in some instances, the system may also indicate the level of modification/editing that was made to the data during any round of editing, e.g., the extent to which the asset data was manipulated from the original, how many times the asset data was altered, etc.

Figure 3A:
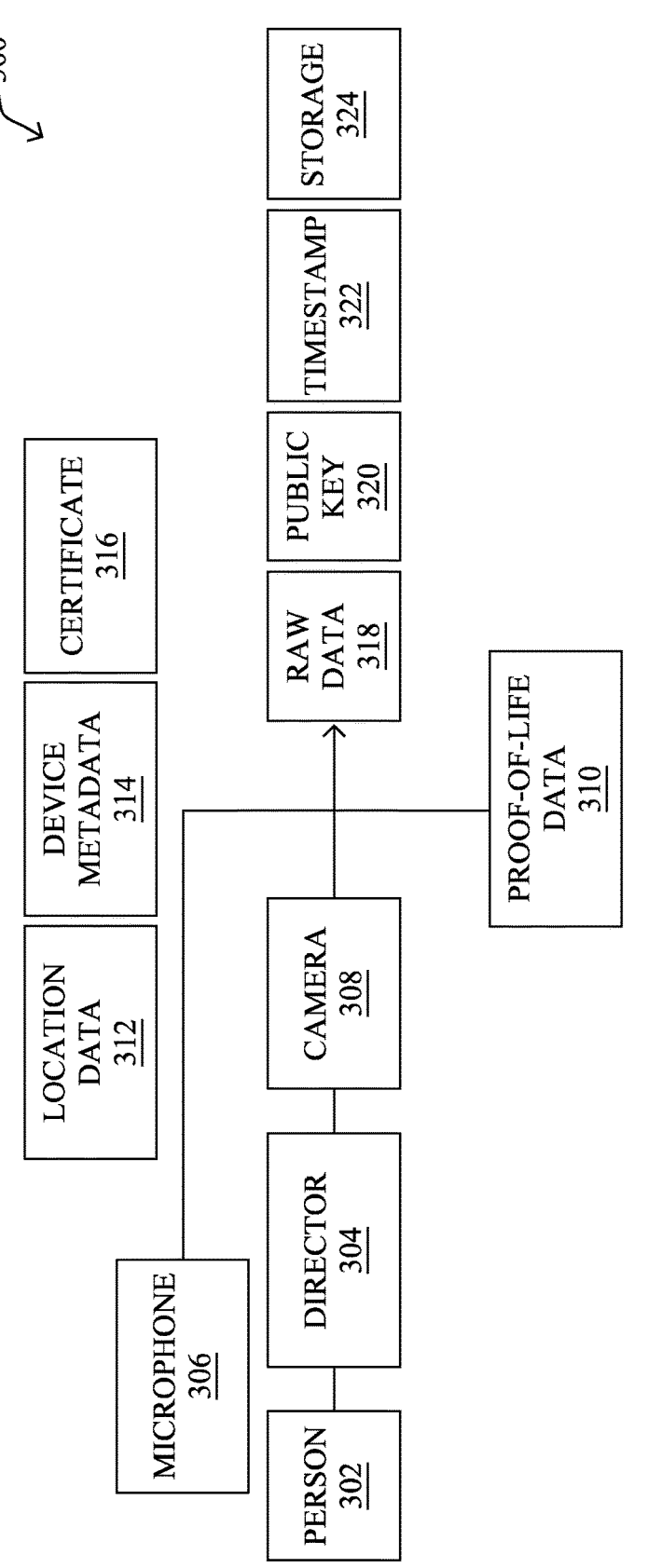
FIGS. 3A-3B illustrate examples of lineage certification for digital assets.
Figure 3B:
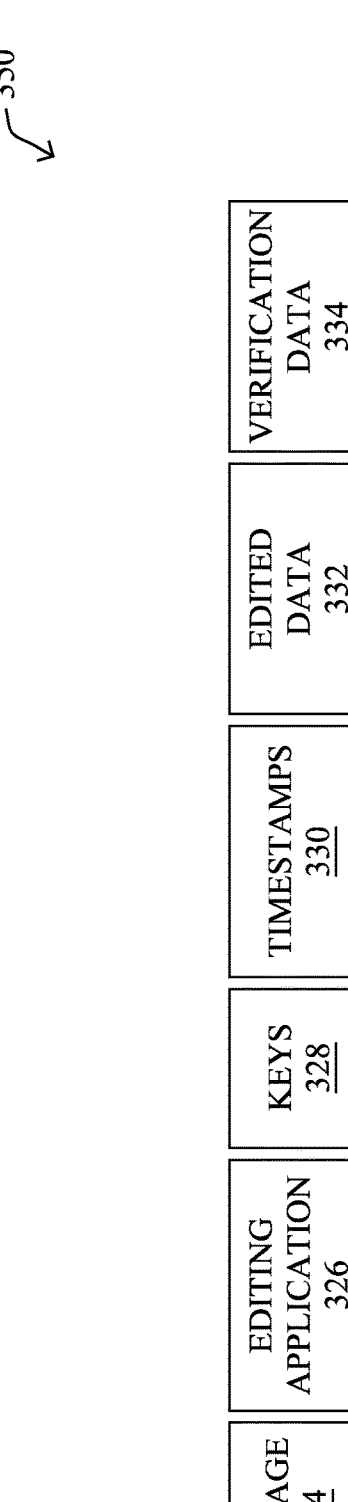

FIGS. 3A-3B illustrate examples of lineage certification for digital assets, according to various implementations, which may be performed by a device (e.g., device 200) executing asset lineage certification process 248). As shown in example 300 in FIG. 3A, assume that there is a real person 302, such as an actor subject to one or more sensors, such as being filmed by a camera 308 and recorded by a microphone 306. In the case of real person 302 being an actor, they may also be directed by a director 304.

During the process of recording shown, the system may continuously or periodically generate proof-of-creation information and associate it with the recorded data, to certify that the data originates from a real person (e.g., person 302), as well as potentially additional information regarding the origin/creation of the data. In some implementations, the system may do so by generating proof-of-life data 310 regarding real person 302, which may include any or all of the following: biometrics such as those generated by optical heart-rate sensors, electrodermal activity monitors, remote non-contact eye tracking sensors, or other biometric sensors, as well as potentially from identity verification methods, too. Identity verification could include both self-sovereign and/ or 3rd party verified (such as company or government-backed) methods that provide proof-of-identify information for real person 302 (e.g., by performing facial recognition, etc.). The captured data from microphone 306 and/or camera 308 may also be associated with proof-of-life data 310 at any given point throughout the recording, allowing the system to show that there is the presence of 'proof-of-life' for the data, in instances in which the captured data is streamed live to one or more consumers.

In some implementations, the proof-of-creation information may further be based on proof-of-origination information, as well. For instance, during recording of the data, the system may also generate location data 312 regarding the location(s) of the sensor(s) that captured the data, such as microphone 306, camera 308, or any other form of sensor that may capture data regarding real person 302. Another form of proof-of-origin data may be device metadata 314 regarding the devices/sensors that captured that data. For instance, device metadata 314 could include network-relevant data for microphone 306 and/or camera 308 such as their IP addresses, Geo-IP information, or other network such as their MAC addresses, among others. In other instances, device metadata 314 may be for another device connected to microphone 306 and/or camera 308 that processes their captured data.

At the point of associating or combining the captured data with proof-of-life data 310, location data 312, and/or device metadata 314, the system may then generate an initial set of one or more public/private keys that include a public key 320 and used to sign the combined set of data with a certificate 316 that certifies the proof-of-creation of the data.

In turn, the system may store the 'raw' data 318, the public key 320 used to sign the combined data, and a timestamp 322 in storage 324 for later retrieval. For instance, a remote user device may access storage 324, to view the video captured by camera 308. In such a case, the user interface via which the video is shown may also indicate the proof-of-creation information associated with it, the authenticity of which can be verified cryptographically thanks to public key 320.

As shown in FIG. 3B, example 350 depicts how the information stored in storage 324 can then be used to both verify the captured data/asset, as well as create a lineage of that data, should it undergo editing after its creation.

More specifically, as shown, assume that the captured data/asset is then retrieved from 324 at a later point in time by an editing application 326. In some instances, storage 324 may provide a user interface that not only presents the data captured in FIG. 3A, but also presents its associated proof-of-creation information via editing application 326, thereby proving to the user of editing application 326 that the data depicts or otherwise was captured from a real person, as well potentially other information about the capture of that data (e.g., where it was captured, the device(s) that captured the data, etc.). This information can also be verified online using the initial key information used to sign the data during its creation.

As part of the editing process, now assume that the user of editing application 326 makes an edit to data 318, thereby creating edited data 332. For instance, say the user shortens the length of captured video, edits out background noise in audio, or the like. In such a case, the system may generate new keys 328 based on the initial public key 320, timestamps 330 regarding when the edit was made, and/or other information, such as the identity of the user of editing application 326, the location or other information regarding editing application 326 or its executing device, the specific edit(s) made to the raw data, or the like. In turn, the system may use new keys 328 to sign the bundle of information and the edited data 332, to form verification data 334 that can be used to verify the lineage of edited data 332.

In other words, edited data 332 may include the combined data set, such as certificate 316, proof-of-life data 310, location data 312, device metadata 314, and the editing history associated with edited data 332. Since new keys 328 were cryptographically generated based on the key information generated in FIG. 3A, this creates an immutable chain of proofs for verification data 334 that the system can use to prove to any subsequent consumer of edited data 332 the chain of events that resulted in the creation of edited data 332, as well as proof that the person depicted or otherwise captured in edited data 332 was indeed a real person.

As would be appreciated, any subsequent edits to edited data 332 may also undergo similar treatment as in the capturing process, thereby extending the chain of lineage for any further edited data.

Figure 4A:
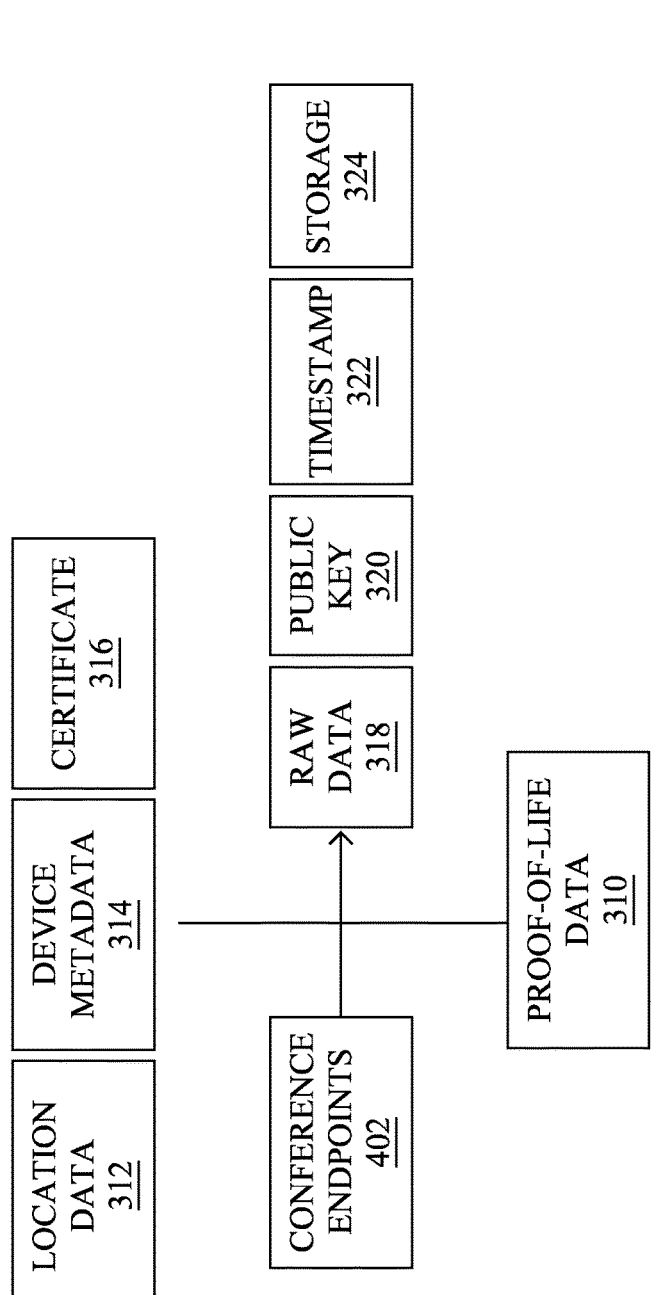
FIGS. 4A-4B illustrates an example of lineage certification of video conferencing data.
Figure 4B:
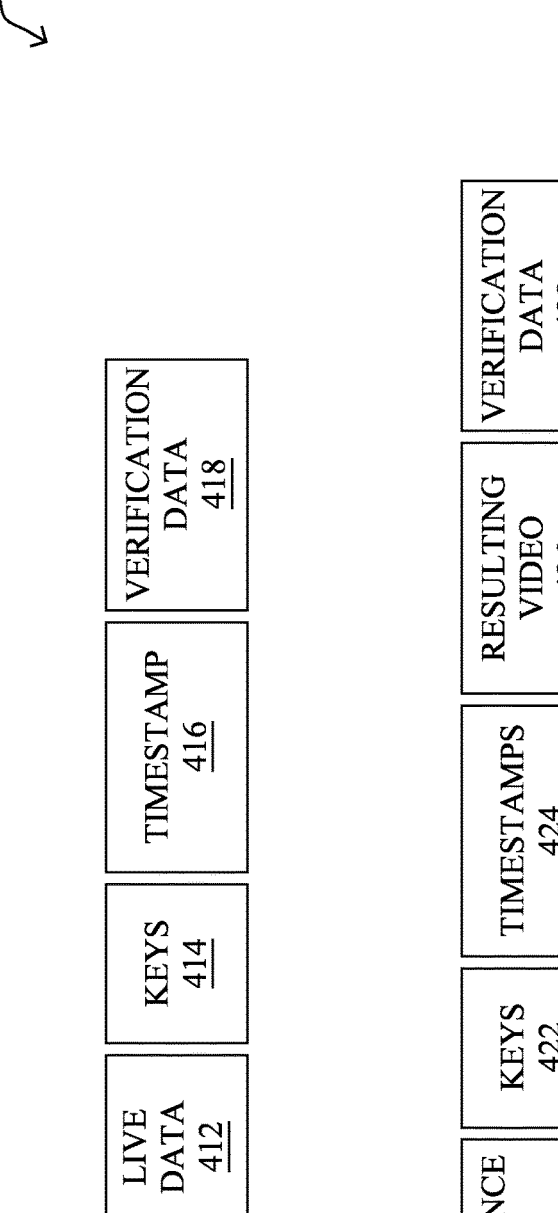

FIGS. 4A-4B illustrates an example of lineage certification of video conferencing data, in further implementations. As shown in example 400 in FIG. 4A, assume now that the capturing sensor(s) are endpoints 402 of a videoconference, such as cameras, microphones, or the like. As noted above, as generative AI continues to evolve, it will become increasingly difficult to distinguish real people in videoconferences from those that were artificially generated.

Similar to the situation in FIG. 3A, the system may again generate proof-of-life data 310 for any or all of the participants of the videoconference. In some instances, proof-of-life data 310 may be embedded directly into the videoconferencing steams, as well. This allows endpoints 402 to indicate that the remote participants of the videoconference are indeed real people.

In addition to the proof-of-life provided by proof-of-life data 310, the system may also generate proof-of-origin data such as location data 312 and/or device metadata 314 regarding any of the endpoints 402 that capture data from a conference participant. In turn, the system may combine this information with the raw data 318 from the videoconference, proof-of-life data 310, a proof-of-origin certificate 316, and/or a timestamp 322. Then, the system may sign the combined information with a generated public key 320. In turn, the system may store the resulting information in storage 324 for later review or editing.

As shown in example 410 in FIG. 4B, the live data 412 generated during the videoconference could be signed using keys 414 in (near) real-time, timestamped with a timestamp 416, etc., using the above approach, to form verification data 418. This allow the endpoints 402 of the videoconference to certify that the other participants are indeed real people and/or captured by known and trusted endpoints 402. In cases in which proof-of-identity information is also captured during the creation process, verification data 418 may also indicate that the identified person is indeed the one depicted in any given stream.

In addition, after the conference has ended, assume now that the streams of live data 412 are combined into conference data 420 for replay at a later time. In such a case, the system may also generate new keys 422 from the initial keys 414, new timestamps 424, etc., and sign the resulting video 426, thereby creating new verification data 428. Thus, when resulting video 426 is later presented for display via a user interface, verification data 428 may also provide an indication that proves not only that the participants of the videoconference are indeed real people and captured by known and trusted endpoints, but also that the resulting video 426 of the videoconference was created in a trusted manner by a trusted entity, as well.

The use of such a mechanism is of direct benefit in a range of scenarios where video conferencing is replacing in-person interaction. This includes financial transactions (e.g., banks and their customers), medical interactions (e.g., doctors and their patients), as well as the broader arena of corporate communication (e.g., between company employees or between employees of different companies).

Figure 5:
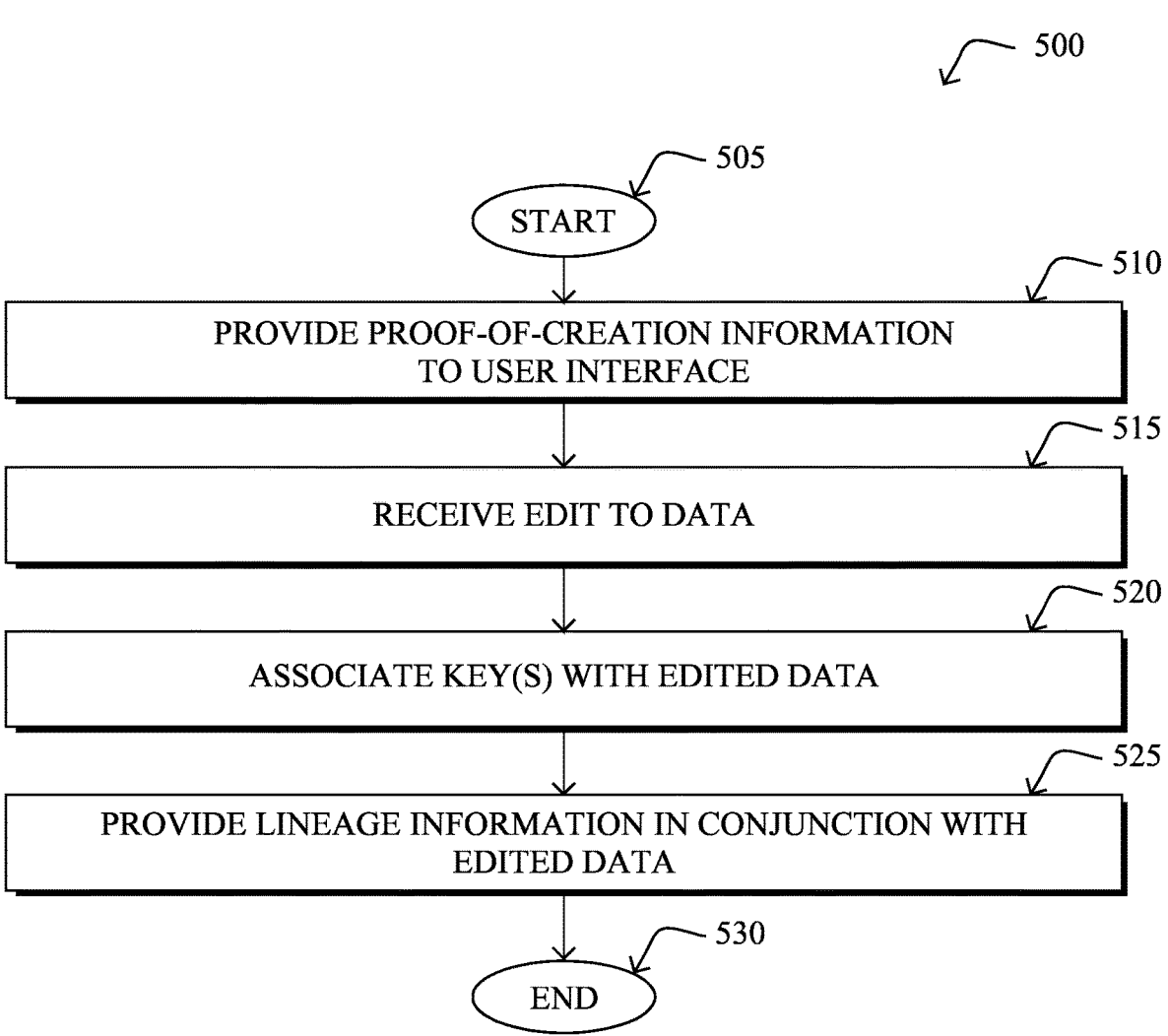
FIG. 5 illustrates an example simplified procedure for certifying the lineage of a digital asset.

FIG. 5 illustrates an example simplified procedure 500 (e.g., a method) for verifying the lineage of a digital asset, in accordance with one or more implementations described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may provide, to a user interface, proof-of-creation information that certifies that data presented by the user interface was created by one or more sensors capturing the data from a real person. In some implementations, the one or more sensors comprise a camera and the data comprises an image that depicts the real person. For instance, the camera may capture the image during a videoconference in which the real person is a participant. In further implementations, the one or more sensors comprise a microphone and the data comprises audio spoken by the real person. In one implementation, the proof-of-creation information comprises a certificate associated with the data that was signed using one or more initial keys. In another implementation, the proof-of-creation information is based in part on non-contact eye tracking of the real person. In some implementations, the proof-of-creation information is based in part on network information associated with the one or more sensors.

At step 515, as detailed above, the device may receive, via the user interface, an edit to the data, to form edited data. For instance, the user interface may be part of an editing application, such as a video editing application, an audio editing application, or the like.

At step 520, the device may associate one or more keys with the edited data that are based on the proof-of-creation information and on the edit to the data, as described in greater detail above. In various implementations, the one or more keys associated with the data are generated using the one or more initial keys and used to sign a certificate associated with the edited data.

At step 525, as detailed above, the device may provide, based on the one or more keys, lineage information to the user interface in conjunction with the edited data that indicates the edit to the data and the proof-of-creation information. In some implementations, the lineage information is based in part on a timestamp associated with the edit. In further implementations, the lineage information is based in part on metadata associated with the device.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for lineage certification for digital assets, it is to be understood that various other adaptations and modifications may be made within the spirit and scope of the implementations herein. For example, while certain implementations are described herein with respect to using certain models for purposes of anomaly detection, the models are not limited as such and may be used for other functions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
   providing, by a device and to a user interface, proof-of-creation information that certifies that data presented by the user interface was created by one or more sensors capturing the data from a real person;
   receiving, at the device and via the user interface, an edit to the data, to form edited data;
   associating, by the device, one or more keys with the edited data that are cryptographically derived from the proof-of-creation information and information identifying the edit to the data, the one or more keys being operative, during verification, to authenticate a cryptographic attestation over the edited data, the proof-of-creation information, and the information identifying the edit; and
   providing, by the device and based on the one or more keys, lineage information to the user interface in conjunction with the edited data that indicates the edit to the data and the proof-of-creation information.

2. The method as in claim 1, wherein the one or more sensors comprise a camera and the data comprises an image that depicts the real person.

3. The method as in claim 2, wherein the camera captures the image during a videoconference in which the real person is a participant.

4. The method as in claim 1, wherein the one or more sensors comprise a microphone and the data comprises audio spoken by the real person.

5. The method as in claim 1, wherein the proof-of-creation information comprises a certificate associated with the data that was signed using one or more initial keys.

6. The method as in claim 5, wherein the one or more keys associated with the data are generated using the one or more initial keys and used to sign a certificate associated with the edited data.

7. The method as in claim 1, wherein the proof-of-creation information is based in part on non-contact eye tracking of the real person.

8. The method as in claim 1, wherein the proof-of-creation information is based in part on network information associated with the one or more sensors.

9. The method as in claim 1, wherein the lineage information is based in part on a timestamp associated with the edit.

10. The method as in claim 1, wherein the lineage information is based in part on metadata associated with the device.

11. An apparatus, comprising:

one or more network interfaces;

a processor coupled to the one or more network interfaces and configured to execute one or more processes; and a memory configured to store a process that is executable by the processor, the process when executed configured to:

provide, to a user interface, proof-of-creation information that certifies that data presented by the user interface was created by one or more sensors capturing the data from a real person;

receive, via the user interface, an edit to the data, to form edited data;

associate one or more keys with the edited data that are cryptographically derived from the proof-of-creation information and information identifying the edit to the data, the one or more keys being operative, during verification, to authenticate a cryptographic attestation over the edited data, the proof-of-creation information, and the information identifying the edit; and provide, based on the one or more keys, lineage information to the user interface in conjunction with the edited data that indicates the edit to the data and the proof-of-creation information.

12. The apparatus as in claim 11, wherein the one or more sensors comprise a camera and the data comprises an image that depicts the real person.

13. The apparatus as in claim 12, wherein the camera captures the image during a videoconference in which the real person is a participant.

14. The apparatus as in claim 11, wherein the one or more sensors comprise a microphone and the data comprises audio spoken by the real person.

15. The apparatus as in claim 11, wherein the proof-of-creation information comprises a certificate associated with the data that was signed using one or more initial keys.

16. The apparatus as in claim 15, wherein the one or more keys associated with the data are generated using the one or more initial keys and used to sign a certificate associated with the edited data.

17. The apparatus as in claim 11, wherein the proof-of-creation information is based in part on non-contact eye tracking of the real person.

18. The apparatus as in claim 11, wherein the proof-of-creation information is based in part on network information associated with the one or more sensors.

19. The apparatus as in claim 11, wherein the lineage information is based in part on a timestamp associated with the edit.

20. A tangible, non-transitory, computer-readable medium storing program instructions that cause a device to execute a process comprising:

providing, by the device and to a user interface, proof-of-creation information that certifies that data presented by the user interface was created by one or more sensors capturing the data from a real person;

receiving, at the device and via the user interface, an edit to the data, to form edited data;

associating, by the device, one or more keys with the edited data that are cryptographically derived from the proof-of-creation information and on information identifying the edit to the data, the one or more keys being operative, during verification, to authenticate a cryptographic attestation over the edited data, the proof-of-creation information, and the information identifying the edit; and providing, by the device and based on the one or more keys, lineage information to the user interface in conjunction with the edited data that indicates the edit to the data and the proof-of-creation information.

* * * * *